April 29, 1958 W. E. WOODS ET AL 2,832,536

ELECTRONIC COMPUTER NETWORKS

Filed Sept. 29, 1955

INVENTORS:
WILLIAM E. WOODS
ROBERT E. WILSON
JOHN H. SWEER
BY G. D. O'Brien
H. H. Losche
ATTYS.

United States Patent Office 2,832,536
Patented Apr. 29, 1958

2,832,536

ELECTRONIC COMPUTER NETWORKS

William E. Woods, Haddonfield, Robert E. Wilson, Moorestown, and John H. Sweer, Collingswood, N. J., assignors, by mesne assignments, to the United States of America as represented by the Secretary of the Navy Application September 29, 1955, Serial No. 537,608

2 Claims. (Cl. 235—61)

The present invention relates to electronic computer networks and more particularly to a device that will divide or multiply a voltage analog by one of a discrete set of numbers, of the form $a+bn$, where $n$ is available in binary form.

A feature of the invention is the use of a series of diode clamping tubes used to vary the attenuation of a resistive network. The resistive network inherently performs division and when used in conjunction with a high-gain inverse-feedback amplifier, the network performs multiplication.

It is a general object of the present invention to provide an inexpensive device that will perform either multiplication or division of a voltage both rapidly and accurately. Other objects and many of the attendant advantages of this invention will be readily appreciated as the same becomes better understood by reference to the following detailed description when considered in connection with the accompanying drawing wherein.

Figure 1:
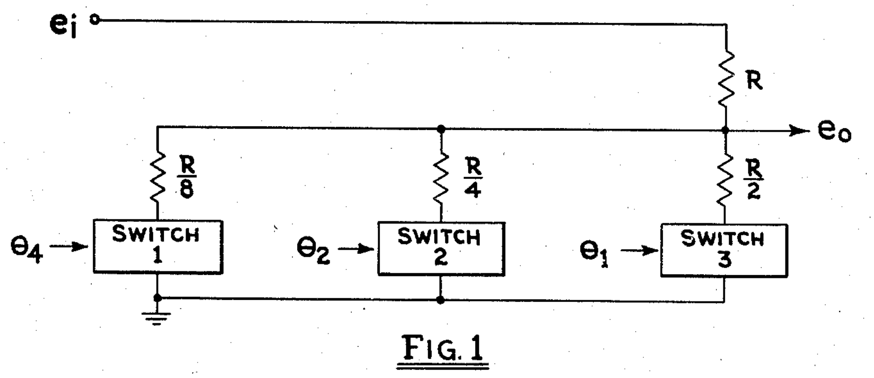
Fig. 1 is a circuit diagram of the device for performing division.

Referring now to the drawing, there is shown in Fig. 1 a resistive network having input and output circuits wherein switches 1, 2 and 3 are in series with resistors R/8, R/4, and R/2, respectively. The switches 1, 2, and 3 might be relays that have open and closed positions, thus when a particular switch is open the resistance would be infinite. It can be seen that the resistors R, R/2, R/4, and R/8, as shown in Fig. 1 form a voltage divider and, $$e_0=\frac{e_1\dfrac{1}{\left(\dfrac{2\theta_1}{R}+\dfrac{4\theta_2}{R}+\dfrac{8\theta_4}{R}\right)}}{\left(\dfrac{1}{\dfrac{2\theta_1}{R}+\dfrac{4\theta_2}{R}+\dfrac{8\theta_4}{R}}\right)+R} \quad (1)$$

and by canceling out R where $\theta=1$ or 0

$$e_0=\frac{\dfrac{e_i}{2\theta_1+4\theta_2+8\theta_4}}{\dfrac{1}{2\theta_1+4\theta_2+8\theta_4}+1} \quad (2)$$

and therefore $$e_0=\frac{e_i}{1+2(\theta_1+2\theta_2+4\theta_4)} \quad (3)$$

now in binary notation $n=\theta_1+2\theta_2+4\theta_4$ and therefore, $$e_0=\frac{e_i}{1+2n} \quad (4)$$

Equation 4 shows that the network inherently performs division, the divisor being the desired form $a+bn$, where $n$ is available in binary form.

Figure 2:
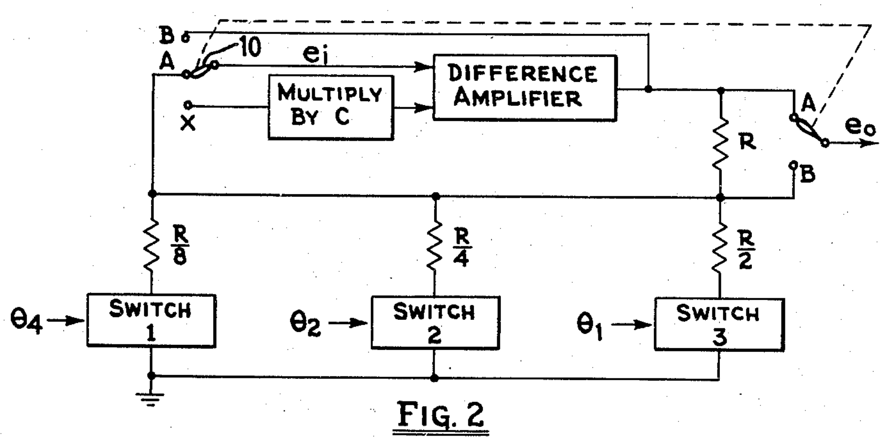
Fig. 2 is a circuit diagram of the device wherein a high-gain inverse-feedback amplifier is added for performing multiplication.

The addition of a difference amplifier to the circuit, as shown in Fig. 2 of the drawing, changes the circuit to a multiplier, and from Fig. 2 of the drawing it can be seen that $$e_0=u(cx-e_1) \quad (5)$$

where $u$ is the gain of the amplifier.

The resistors shown in Fig. 2 of the drawing form a voltage divider as in Fig. 1 and it can be seen that when switch 10 is contacting position A, $$e_i=\frac{e_0\dfrac{1}{\left(\dfrac{2\theta_1}{R}+\dfrac{4\theta_2}{R}+\dfrac{8\theta_4}{R}\right)}}{\left(\dfrac{1}{\dfrac{2\theta_1}{R}+\dfrac{4\theta_2}{R}+\dfrac{8\theta_4}{R}}\right)+R} \quad (6)$$

and by canceling out R and simplifying, $$e_i=\frac{e_0}{1+2(\theta_1+2\theta_2+4\theta_4)} \quad (7)$$

now in binary notation $$n=\theta_1+2\theta_2+4\theta_4$$

and therefore, $$e_i=\frac{e_0}{1+2n} \quad (8)$$

and substituting Equation 8 in Equation 5

$$e_0=u\left(cx-\frac{e_0}{1+2n}\right) \quad (9)$$

and by arranging terms $$e_0=\left(\frac{2n+1}{1+\dfrac{2n+1}{u}}\right)cx \quad (10)$$

By making the amplifier gain very large, in fact, by making $u\rightarrow\infty$ Equation 10 becomes $$e_0=(2n+1)cx \quad (11)$$

It has been shown mathematically that the dividing circuit as illustrated in Fig. 1 of the drawing can readily be changed to a multiplying circuit by adding a high-gain inverse feedback amplifier. In Fig. 2 of the drawing, it can be seen that switch 10 can be used to shunt out the difference amplifier and thus the same basic circuit can readily be used for either multiplication or division. In Fig. 2 of the drawing, when switch 10 is in contact with position A the difference amplifier is in the circuit and multiplication is performed by the circuit. When switch 10 is in contact with position B, the difference amplifier is shunted, and the circuit performs division.

Figure 3:
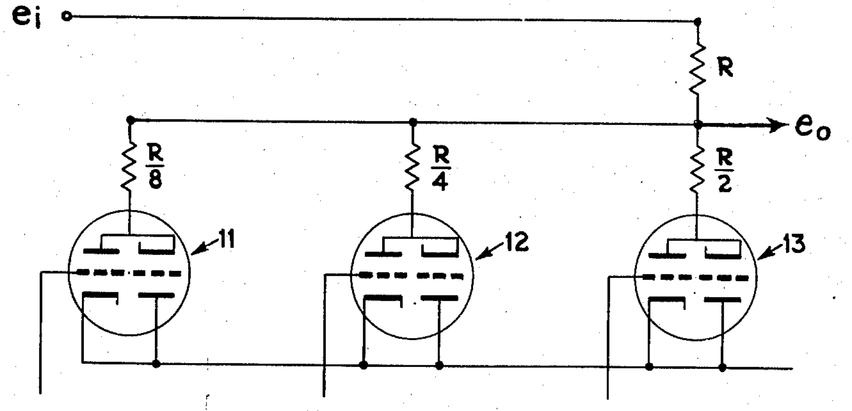
Fig. 3 is a circuit diagram showing a set of electronic clamp tubes used to vary the attenuation of a resistive network.

In Fig. 3 of the drawing there is shown electronic clamp tubes 11, 12, and 13, which are used as the switches to vary the attenuation of a resistive network. The circuit as shown in Fig. 3 is similar to the circuit, as shown in Fig. 1, however it is obvious that the clamping tubes can also be used with the multiplier circuit as shown in Fig. 2.

Obviously, many modifications and variations of the present invention are possible in the light of the above teaching. It is therefore to be understood that the invention may be practiced otherwise than as specifically described.

What is claimed is:

1. An electronic computer circuit for performing multiplication and division comprising, input and output circuit means, an inverse feedback amplifier connected across said input and output circuit means, a plurality of attenuating circuits connected to said input and output circuit means, switching means in each of said plurality of attenuating circuits, a separate signal source for operating each said switching means and means for switching said inverse feedback amplifier from inactive to active condition whereby said computer circuit performs division when said amplifier is inactive and whereby said computer circuit performs multiplication when said amplifier is active.

2. An electronic computer circuit for performing multiplication and division as set forth in claim 1 wherein said switching means in each of said plurality of attenuating circuits comprises clamping tubes for varying the attenuation of said attenuating circuit.

References Cited in the file of this patent

UNITED STATES PATENTS

| | | |
|---|---|---|
| 1,696,417 | Roberts | Dec. 25, 1928 |
| 2,731,631 | Spaulding | Jan. 17, 1956 |

OTHER REFERENCES

IRE Convention Record, part 7, April 1953, page 19.

Electronic Analog Computers (Korn & Korn), 1952.

Electronic Engineering (Nikiforuk), March 1955, pages 118–119.